UNITED STATES PATENT OFFICE.

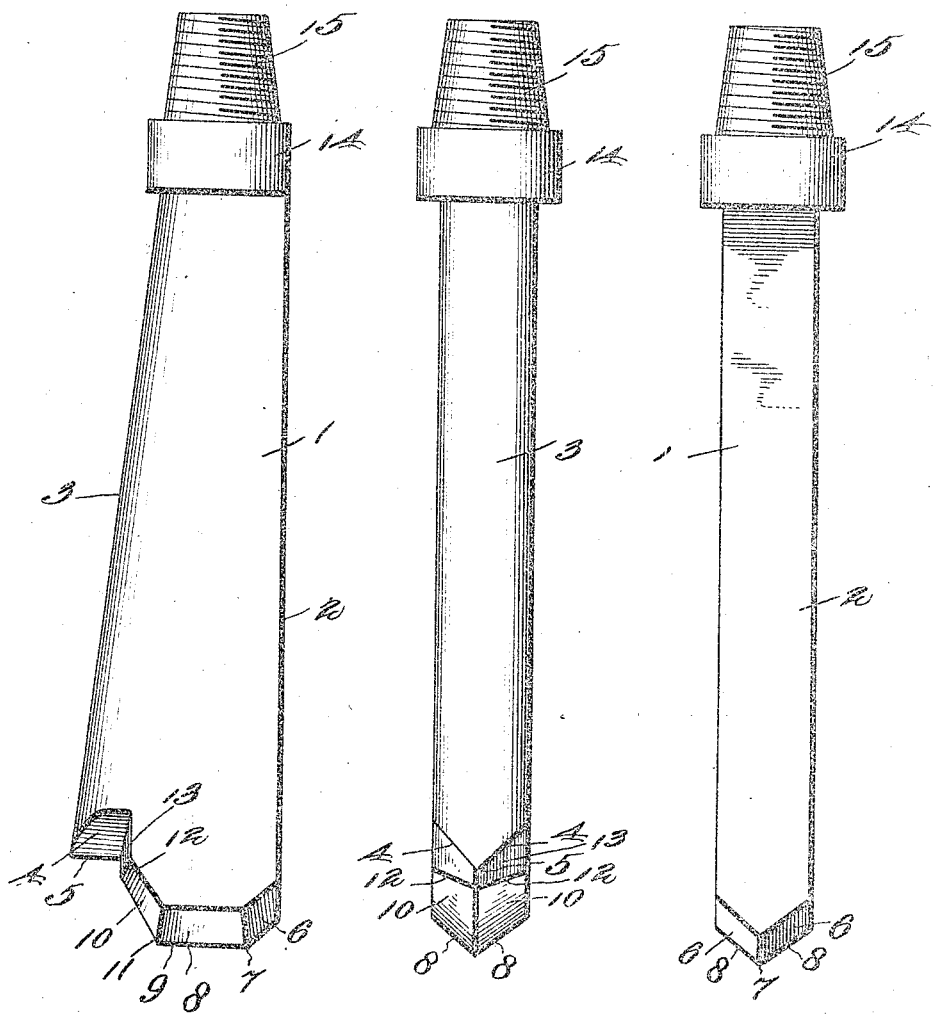

EUGENE L. DAVIDSON, OF BURLINGAME, CALIFORNIA.

COMBINED ROCK-DRILL AND REAMER-BIT.

1,176,884.     Specification of Letters Patent.     Patented Mar. 28, 1916.

Application filed February 26, 1915. Serial No. 10,779.

*To all whom it may concern:*

Be it known that I, EUGENE L. DAVIDSON, a citizen of the United States, residing at Burlingame, in the county of San Mateo and State of California, have invented certain new and useful Improvements in Combined Rock-Drills and Reamer-Bits; and I do hereby declare the following to be a full, clear and exact description of the invention, such as will enable others skilled in the art to which it appertains to make and use the same.

This invention relates to combined rock drills and reamer bits, and one of the principal objects of the invention is to provide a rock drill having an integral reamer bit at one side thereof and so constructed that the drill and reamer bit will pass through a casing of given size and form a hole of sufficient size to admit the casing, said hole being of greater diameter than the extreme width of the tool.

Another object of the invention is to provide a combined rock drill and reamer bit having seven cutting corners, and a reamer bit extending laterally from the drill bit and provided with cutting corners and edges, thus eliminating the necessity of using a separate reamer bit.

The foregoing and other objects may be attained by means of the construction illustrated in the accompanying drawing, in which—

Figure 1 is a side elevation of a combined rock drill and reaming bit made in accordance with this invention, Fig. 2 is an edge view of the same looking at the reamer bit side of the tool, and Fig. 3 is a view looking at the side of the drill opposite the reamer bit.

Referring to the drawing, the numeral 1 designates the tool having a straight edge 2 and a transversely curved inclined side 3 which terminates in a reamer bit having oppositely inclined sides 4 and a plain cutting edge 5. The drill bit is provided with the oppositely beveled portion 6 forming a cutting corner 7 and the oppositely beveled sides 8 having a straight lower edge 9. The opposite side of the bit from the beveled portion 6 is also beveled at 10 on opposite sides to form the cutting corners 11 and 12 and from this point to the edge 5 of the reamer bit, the drill bit is also beveled as at 13 on opposite sides. At the opposite end of the tool is an integral collar 14 and a threaded tapering attaching bar 15.

From the foregoing it will be obvious that the reaming bit connected integrally with the drill will cut a hole slightly larger than the major diameter of the tool, and will thus permit the use of the same size casing all the way down.

A combined rock drill and reamer bit made in accordance with this invention can be used to advantage in all kinds of drilling and operated by any character of power, and will save time and expense in drilling as well as reaming the hole, and will eliminate the use of a separate reamer.

Various changes may be made in the details of construction without departing from the spirit and scope of the invention as defined in the claim.

What is claimed is:—

In a rock drill having a stock with a straight edge, a transversely curved inclined opposite edge, and a cutting face formed on one end thereof comprising a horizontal cutting edge having oppositely beveled sides, inclined oppositely beveled side cutting edges radiating from said horizontal cutting edge, one of said side cutting edges extending to a point beyond the other side edge, a cutting edge having oppositely beveled sides extending upwardly from said long beveled edge, and an extension extending at right angles from said upwardly extending cutting edge having a cutting edge formed thereon, the meeting edges of said beveled faces forming cutting corners.

In testimony whereof I affix my signature in presence of two witnesses.

EUGENE L. DAVIDSON.

Witnesses:
D. E. SEGER,
HARRY SINGLETON.